US011023786B2

(12) United States Patent
Hiroki

(10) Patent No.: US 11,023,786 B2
(45) Date of Patent: Jun. 1, 2021

(54) DEVICE CONTROL APPARATUS

(71) Applicant: TOYOTA JIDOSHA KABUSHIKI KAISHA, Toyota (JP)

(72) Inventor: Daisuke Hiroki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/459,691

(22) Filed: Jul. 2, 2019

(65) Prior Publication Data

US 2020/0104629 A1 Apr. 2, 2020

(30) Foreign Application Priority Data

Oct. 1, 2018 (JP) .............................. JP2018-186567

(51) Int. Cl.
*G06K 9/62* (2006.01)
*G06K 9/00* (2006.01)
(Continued)

(52) U.S. Cl.
CPC ......... *G06K 9/628* (2013.01); *G06K 9/00369* (2013.01); *G06K 9/00382* (2013.01);
(Continued)

(58) Field of Classification Search
CPC ............... G06K 9/628; G06K 9/00369; G06K 9/00382; G06K 2009/00395; G06K 9/00389; G06K 9/00335; G06K 9/00845; G06K 9/00355; B60W 40/08; B60W 40/10; B60W 40/12; G06F 3/017; B60R 16/02

See application file for complete search history.

(56) References Cited

U.S. PATENT DOCUMENTS 9,996,757 B1 * 6/2018 Chan .................. G06K 9/00355
2011/0158546 A1 6/2011 Huang et al.
(Continued)

FOREIGN PATENT DOCUMENTS

EP 2743799 A2 6/2014
JP 2013-205983 A 10/2013
(Continued)

OTHER PUBLICATIONS

Microsoft: "Kinect for Windows—Human Interface Guidelines v1.7", Mar. 18, 2013 (Mar. 18, 2013).

*Primary Examiner* — Phuoc Tran
(74) *Attorney, Agent, or Firm* — Oliff PLC

(57) ABSTRACT

A device control apparatus includes an imaging unit configured to capture an image of an occupant in a vehicle, a first recognition unit configured to recognize a posture of the occupant based on the image captured by the imaging unit, a second recognition unit configured to recognize a state of a hand including at least a shape of the hand of the occupant based on the image captured by the imaging unit, a discrimination processing unit configured to specify a device to be controlled and an operation to be executed based on the posture of the occupant recognized by the first recognition unit and the state of the hand recognized by the second recognition unit, and a controller configured to issue a control command corresponding to the specified device to be controlled and the specified operation to be executed.

6 Claims, 8 Drawing Sheets

(51) Int. Cl.
    *B60W 40/08*     (2012.01)
    *B60W 40/10*     (2012.01)
    *B60W 40/12*     (2012.01)

(52) U.S. Cl.
    CPC ............ *B60W 40/08* (2013.01); *B60W 40/10* (2013.01); *B60W 40/12* (2013.01); *G06K 2009/00395* (2013.01)

(56) References Cited

U.S. PATENT DOCUMENTS

| | | | |
|---|---|---|---|
| 2011/0286676 A1* | 11/2011 | El Dokor | B62D 1/00 |
| | | | 382/225 |
| 2013/0257720 A1 | 10/2013 | Noda et al. | |
| 2014/0125584 A1 | 5/2014 | Xun et al. | |
| 2019/0092169 A1* | 3/2019 | Thurimella | B60K 35/00 |
| 2020/0031369 A1* | 1/2020 | Saito | G06K 9/00355 |

FOREIGN PATENT DOCUMENTS

| | | |
|---|---|---|
| KR | 10-2008-0074577 A | 8/2008 |
| KR | 10-2014-0059109 A | 5/2014 |

\* cited by examiner

FIG. 4

DISCRIMINATION PROCESS TABLE

| | SKELETON COORDINATE SEQUENCE | HAND STATE | | CONTROL TARGET DEVICE | OPERATION |
|---|---|---|---|---|---|
| | | HAND SHAPE | HAND TIP DIRECTION | | |
| 1 | {(x1, y1, z1), ···} | ROCK SHAPE | NONE | AIR CONDITIONER | OFF |
| 2 | {(x2, y2, z2), ···} | INDEX FINGER | RIGHT | PASSENGER SEAT WINDOW | VOICE RECOGNITION ACTIVATION |
| 3 | {(x3, y3, z3), ···} | V SIGN | NONE | AIR CONDITIONER | ON |
| 4 | {(x4, y4, z4), ···} | PAPER SHAPE | NONE | WIPER | SERVICE MODE |
| ... | ... | ... | ... | ... | ... |
| n | {(xn, yn, zn), ···} | INDEX FINGER | UP | SLIDE ROOF | VOICE RECOGNITION ACTIVATION |

FIG. 5

DISCRIMINATION PROCESS TABLE

| | SKELETON COORDINATE SEQUENCE | HAND STATE | | MAINTENANCE TIME (msec) | CONTROL TARGET DEVICE | OPERATION |
|---|---|---|---|---|---|---|
| | | HAND SHAPE | HAND TIP DIRECTION | | | |
| 1 | {(x1, y1, z1), ···} | ROCK SHAPE | NONE | 1000 | AIR CONDITIONER | OFF |
| 2 | {(x2, y2, z2), ···} | INDEX FINGER | RIGHT | 1000 | PASSENGER SEAT WINDOW | VOICE RECOGNITION ACTIVATION |
| 3 | {(x3, y3, z3), ···} | V SIGN | NONE | 1000 | AIR CONDITIONER | ON |
| 4 | {(x4, y4, z4), ···} | PAPER SHAPE | NONE | 2000 | WIPER | SERVICE MODE |
| ... | ... | ... | ... | ... | ... | ... |
| n | {(xn, yn, zn), ···} | INDEX FINGER | UP | 500 | SLIDE ROOF | VOICE RECOGNITION ACTIVATION |

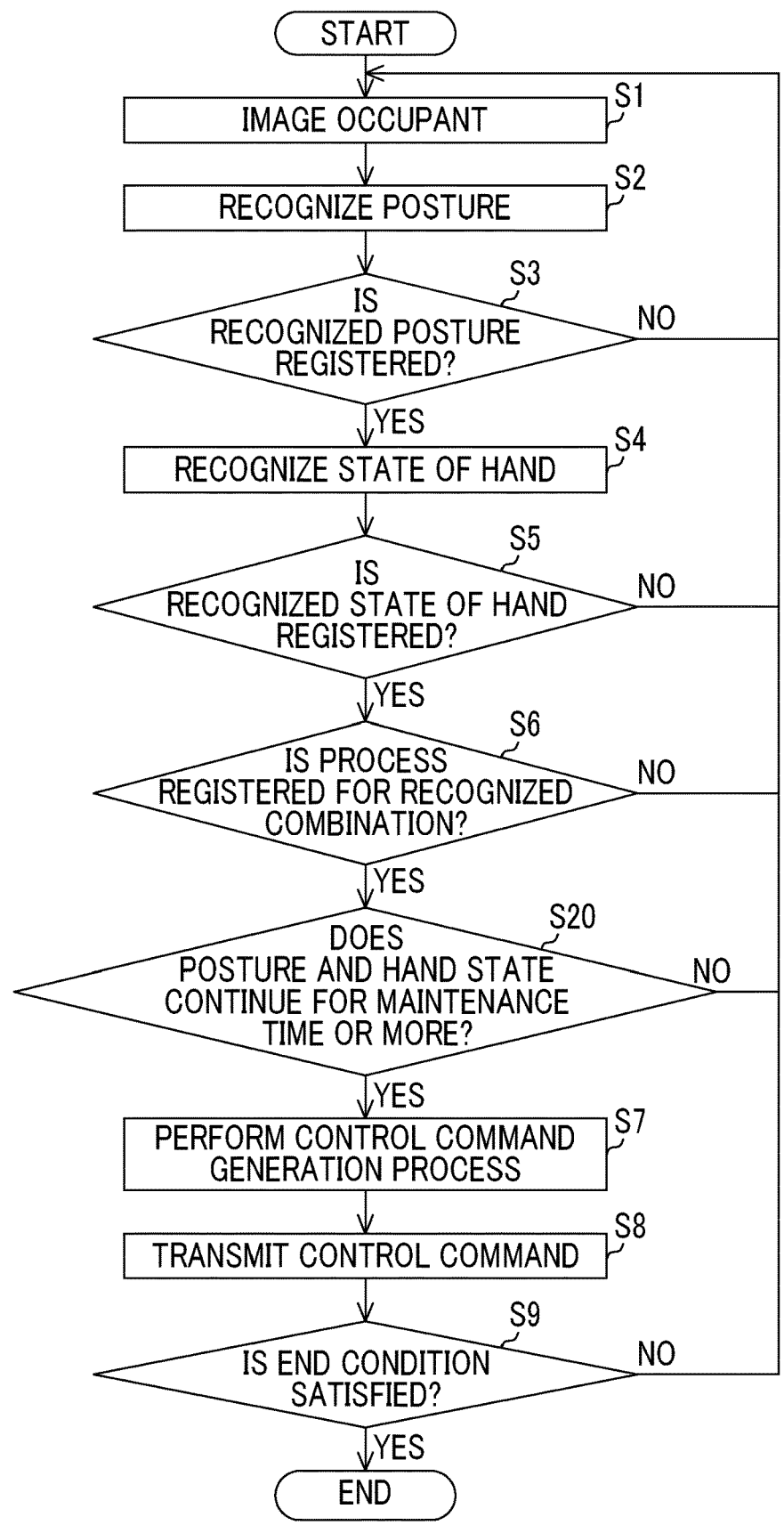

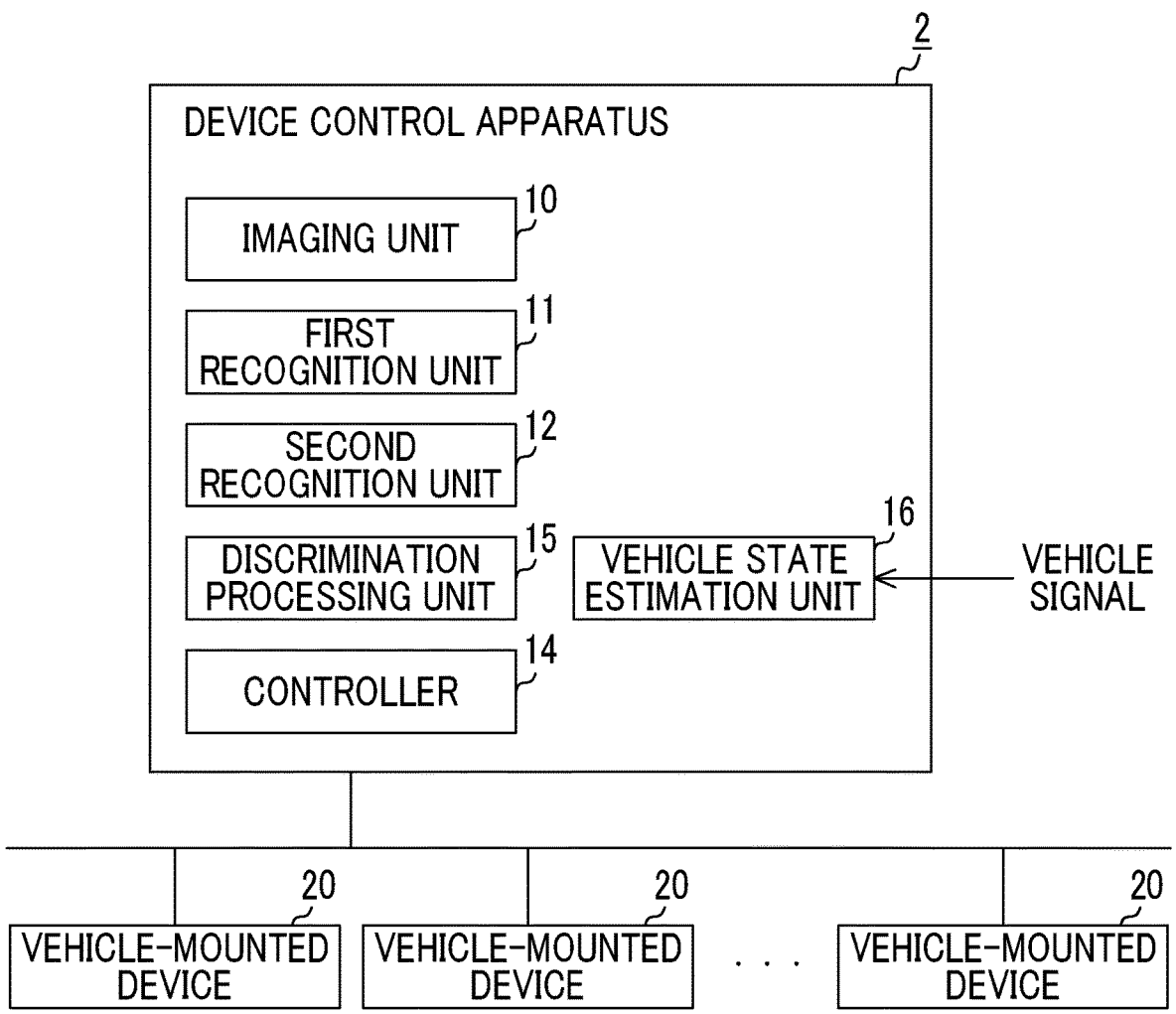

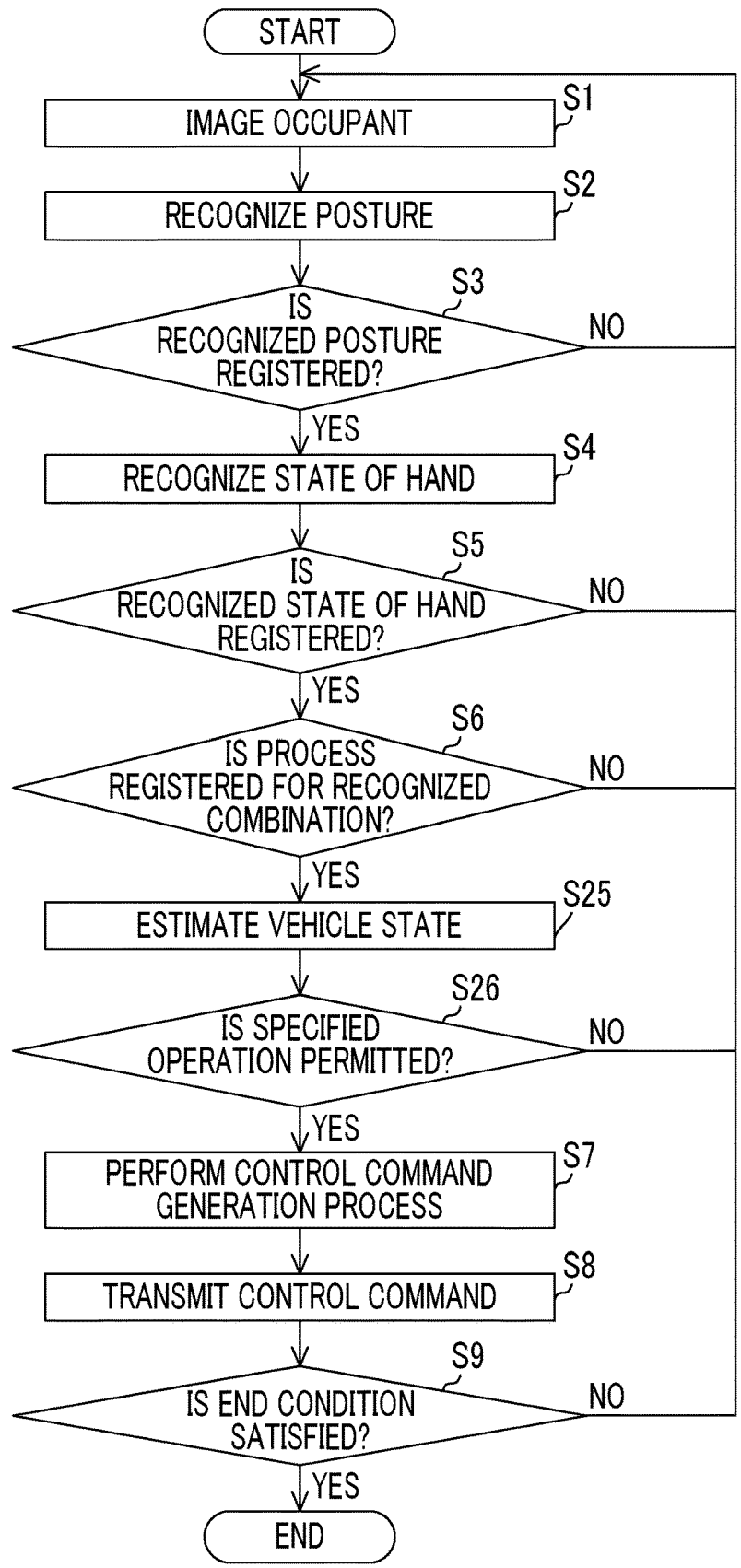

DEVICE CONTROL APPARATUS

INCORPORATION BY REFERENCE

The disclosure of Japanese Patent Application No. 2018-186567 filed on Oct. 1, 2018 including the specification, drawings and abstract is incorporated herein by reference in its entirety.

BACKGROUND

1. Technical Field

The present disclosure relates to a device control apparatus for controlling an electronic device.

2. Description of Related Art

Japanese Unexamined Patent Application Publication No. 2013-205983 (JP 2013-205983 A) describes an information input device that recognizes a shape, a position, and a posture of a hand tip of user, and outputs a control command for a control target device based on the shape of the hand tip of the user or time-series information of a change in a state thereof.

SUMMARY

When the information input device described in JP 2013-205983 A is applied to a manipulation of a vehicle-mounted device, there is an influence of vibration or the like during traveling of a vehicle. Therefore, it is difficult for a user to accurately present the shape of the hand tip or the change in the state thereof. Therefore, in a configuration in which the vehicle-mounted device is manipulated based on the shape of the hand tip or the time-series information of the change in the state thereof, a manipulation of the vehicle-mounted device intended by the user is likely to be unable to be performed or a manipulation of the vehicle-mounted device not intended by the user is likely to be performed.

The present disclosure provides a device control apparatus capable of accurately discriminating a manipulation instruction of a user with respect to a vehicle-mounted device.

An aspect of the present disclosure relates to a device control apparatus for controlling a device mounted in a vehicle. The device control apparatus includes an imaging unit configured to capture an image of an occupant in the vehicle, a first recognition unit configured to recognize a posture of the occupant based on the image captured by the imaging unit, a second recognition unit configured to recognize a state of a hand including at least a shape of the hand of the occupant based on the image captured by the imaging unit, a discrimination processing unit configured to specify a device to be controlled and an operation to be executed based on the posture of the occupant recognized by the first recognition unit and the state of the hand recognized by the second recognition unit, and a controller configured to issue a control command corresponding to the specified device to be controlled and the specified operation to be executed.

In the device control apparatus according to the aspect of the present disclosure, the discrimination processing unit may be configured to specify the device to be controlled and the operation to be executed, by referring to discrimination processing information in which information indicating the posture of the occupant, information indicating the state of the hand, information indicating the device, and information indicating the operation are associated in advance.

In the device control apparatus according to the aspect of the present disclosure, in the discrimination processing information, a skeleton pattern represented by a skeleton coordinate sequence may be defined as the information indicating the posture of the occupant, and a shape of the hand or a combination of the shape and a direction of the hand may be defined as the information indicating the state of the hand. The first recognition unit may be configured to recognize a skeleton coordinate sequence of the occupant from the image captured by the imaging unit. The second recognition unit may be configured to recognize a shape and direction of the hand of the occupant from the image captured by the imaging unit. The discrimination processing unit may be configured to specify a device and an operation associated with the recognized posture of the occupant and the recognized state of the hand as the device to be controlled and the operation to be executed, based on a degree of matching between recognition results of the first recognition unit and the second recognition unit and the discrimination processing information.

In the device control apparatus according to the aspect of the present disclosure, in the discrimination processing information, a maintenance time of the posture of the occupant and the state of the hand may be further defined in association with each combination of the information indicating the posture of the occupant and the information indicating the state of the hand. The discrimination processing unit may be configured to also determine whether the posture of the occupant recognized by the first recognition unit and the state of the hand recognized by the second recognition unit have continued for the maintenance time defined in the discrimination processing information or more, when the discrimination processing unit specifies the device to be controlled and the operation to be executed based on a degree of matching between recognition results of the first recognition unit and the second recognition unit and the discrimination processing information. The controller may be configured to issue the control command when the discrimination processing unit specifies the device to be controlled and the operation to be executed, and determines that the posture of the occupant recognized by the first recognition unit and the state of the hand recognized by the second recognition unit have continued for the maintenance time defined in the discrimination processing information, or more.

The device control apparatus according to the aspect of the present disclosure may further include a vehicle state estimation unit configured to estimate a state of the vehicle. The discrimination processing unit may be configured to decide whether to permit the specified operation based on the state of the vehicle estimated by the vehicle state estimation unit. The controller may be configured to issue the control command when the discrimination processing unit specifies the device to be controlled and the operation to be executed and decides that the specified operation is permitted.

In the device control apparatus according to the aspect of the present disclosure, the controller may be configured to issue an auxiliary command for interrupting or changing an operation instructed by the control command when a predetermined condition is satisfied after the controller issues the control command.

According to the aspect of the present disclosure, it is possible to provide a device control apparatus capable of accurately discriminating a manipulation instruction of a user with respect to a vehicle-mounted device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram illustrating an example of a discrimination processing table to which the device control apparatus according to the first embodiment refers;

FIG. 5 is a diagram illustrating an example of a discrimination processing table to which the device control apparatus according to a modification example of the first embodiment refers;

FIG. 6 is a flowchart illustrating a control process that is executed by the device control apparatus according to a modification example of the first embodiment;

FIG. 7 is a functional block diagram of a device control apparatus according to a second embodiment;

FIG. 8 is a flowchart illustrating a control process that is executed by the device control apparatus according to the second embodiment.

DETAILED DESCRIPTION OF EMBODIMENTS

In a device control apparatus according to embodiments, control assigned in advance is performed based on a combination of a posture and a shape of a hand of an occupant. By incorporating the posture of the occupant into discrimination of a control target device and content of the control, it is possible to accurately detect a manipulation instruction of the device from the occupant.

First Embodiment

Configuration

Figure 1:
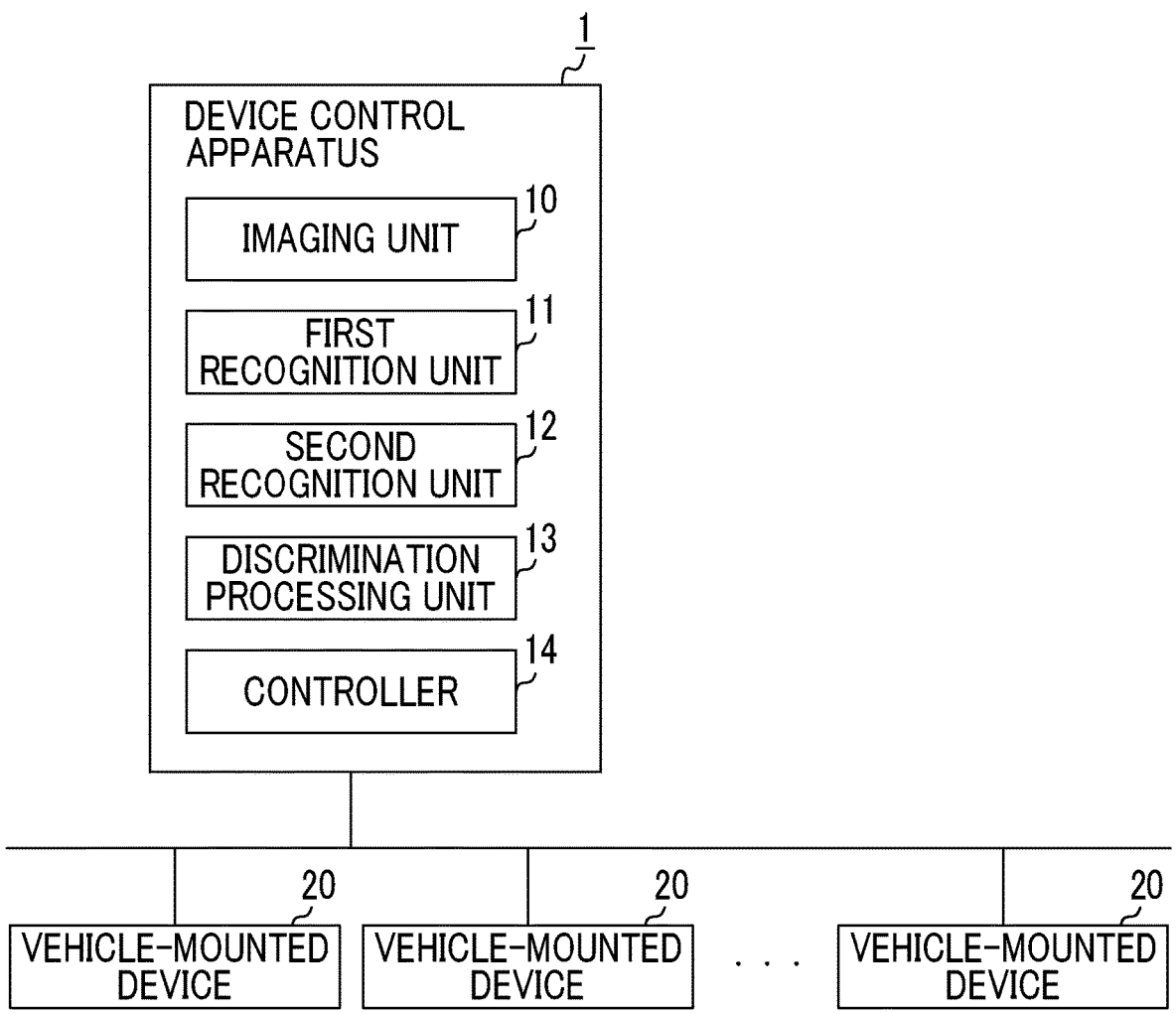
FIG. 1 is a functional block diagram of a device control apparatus according to a first embodiment.

FIG. 1 is a functional block diagram of a device control apparatus according to a first embodiment.

The device control apparatus 1 is an apparatus that controls an operation of a vehicle-mounted device 20 connected via a communication network or a signal line, and includes an imaging unit 10, a first recognition unit 11, and a second recognition unit 12, a discrimination processing unit 13, and a controller 14. Examples of the vehicle-mounted device 20 that is controlled by the device control apparatus 1 may include a power window, an air conditioner, a wiper, a stereo, a navigation system, a headlight, and in-vehicle lightings, but are not limited thereto.

The imaging unit 10 is an imaging device such as a camera and captures an image of an occupant. The imaging unit 10 is provided at a position (for example, a position near a roof on the front side of the vehicle) in which an upper body of the occupant and a hand of the occupant disposed in a space near the upper body can be imaged. The imaging unit 10 may be provided at each seat to image one occupant or may be provided at a specific position in the vehicle to simultaneously image a plurality of occupants. Further, either a visible light camera or an infrared camera can be used for the imaging unit 10.

The first recognition unit 11 recognizes a posture of the occupant based on the image captured by the imaging unit 10. In the embodiment, the first recognition unit 11 detects a skeleton of the occupant from the captured image. The skeleton of the occupant can be recognized using a known skeleton detection algorithm and can be represented by a combination of position information of a plurality of joints of a person.

The second recognition unit 12 estimates a state of the hand of the occupant based on the image captured by the imaging unit 10. Here, the state of the hand of the occupant refers to a shape of the hand or a combination of the shape of the hand and a direction of the hand. The shape of the hand of the occupant is constituted by a combination of a state of folding and unfolding of each finger of the hand, an interval between adjacent fingers, and a shape of a palm. The direction of the hand can be specified by a direction of an extended fingertip or a direction of the palm.

The discrimination processing unit 13 specifies the vehicle-mounted device 20 to be controlled and the operation to be executed by the vehicle-mounted device 20 to be controlled based on the posture of the occupant detected by the first recognition unit 11 and the state of the hand detected by the second recognition unit 12. The discrimination processing unit 13 holds a discrimination processing table in which the vehicle-mounted device 20 to be controlled and the operation to be executed are associated in advance for each combination of the information indicating the posture of the occupant and the information indicating the state of the hand. The discrimination processing unit 13 refers to the discrimination processing table, and specifies the vehicle-mounted device 20 to be controlled and the operation to be executed based on a degree of matching between recognition results of the first recognition unit 11 and the second recognition unit 12 and information defined in the discrimination processing table. The discrimination processing table is stored in a storage device such as a memory included in the device control apparatus 1. Further, the vehicle-mounted device 20 to be controlled refers to a device that the occupant desires to finally operate through a combination of the posture of the occupant and the state of the hand. Further, details of a process that is performed by the discrimination processing unit 13 in order to specify the vehicle-mounted device 20 to be controlled and the operation to be executed will be described below.

The controller 14 generates and issues a control command corresponding to the vehicle-mounted device 20 to be controlled and the operation to be executed, which have been specified by the discrimination processing unit 13. The instruction that can be made by the control command is not particularly limited, and may include an instruction to execute an operation for receiving a request for controlling the vehicle-mounted device 20, in addition to an instruction for controlling the operation of the vehicle-mounted device 20 such as turning on or off the vehicle-mounted device 20 to be controlled, changing an operation mode, volume, temperature, brightness, or operating speed. Examples of the operation of receiving a request for controlling the vehicle-mounted device 20 include an operation of causing the voice recognition device to start a voice recognition process. When the operation to be executed is for the vehicle-mounted device 20 to be controlled, the control command corresponding to the vehicle-mounted device 20 to be controlled and the operation to be executed, which have been specified, corresponds to a control command to be sent to the vehicle-mounted device to be controlled. When the operation to be executed is for a device (for example, a voice recognition device) separate from the vehicle-mounted device 20 to be controlled, the control command corresponds to a control command to be sent to the separate device.

Further, after the controller 14 issues the control command to instruct an operation specified by the discrimination processing unit 13, the controller 14 can issue an auxiliary command to instruct an auxiliary operation when a predetermined condition is satisfied. Examples of the auxiliary operation include interruption, cancellation, or changing of the operation instructed by the control command, and output adjustment, but are not limited thereto. Further, examples of a condition to be satisfied in order for the controller 14 to issue the auxiliary command may include that a manipulation of an input device such as a switch, a button, a lever, or a dial provided in the vehicle has been performed, that a posture of the occupant or a state of the hand that serves as a trigger for issuing a control command has been changed, that the posture of the occupant or the state of the hand determined in advance to issue the auxiliary command has been detected, and that a specific word is uttered by the occupant, but are not limited thereto. When the posture of the occupant or the state of the hand is used as a trigger for issuing the auxiliary command, the posture of the occupant and the state of the hand can be detected by the first recognition unit 11 and the second recognition unit 12, respectively.

For example, the controller 14 can issue a control command for instructing a manipulation for opening the window of the passenger seat, which has been specified based on the combination of the posture of the occupant and the state of the hand, and then issue an auxiliary command for stopping a window opening operation under the condition that any one of switches provided in a steering wheel (a switch that is not normally used for a window manipulation) is manipulated. By the controller 14 issuing such an auxiliary command, an occupant at a driver's seat can stop the opening operation of the window of the passenger seat without releasing the hand from the steering wheel during driving. Further, the controller 14 can issue a control command for instructing start of the voice recognition process, which is specified based on the combination of the posture of the occupant and the state of the hand, and then, issue an auxiliary command for instructing interruption of the voice recognition process under the condition that the posture of the occupant changes. By the controller 14 issuing such an auxiliary command, it is possible to rapidly interrupt the started voice recognition process without performing a special manipulation. By the controller 14 being able to issue the auxiliary command, it is possible to improve usability of the vehicle-mounted device 20 to be controlled. The auxiliary command is intended to make it easier to use the vehicle-mounted device 20 to be controlled. An instruction to interrupt the manipulation instructed by the control command and return to an original state (cancellation of a manipulation), an instruction to interrupt the manipulation instructed by the control command and perform another manipulation (changing of the manipulation), an instruction to change an output of a temperature, volume, brightness, or the like (output adjustment) after the manipulation instructed by the control command has been started, or the like, in addition to the interruption of the manipulation described herein, may be performed by the auxiliary command.

Control Process

Hereinafter, details of the device control apparatus according to the first embodiment will be described below with reference to FIGS. 1 to 4 together.

Figure 2:
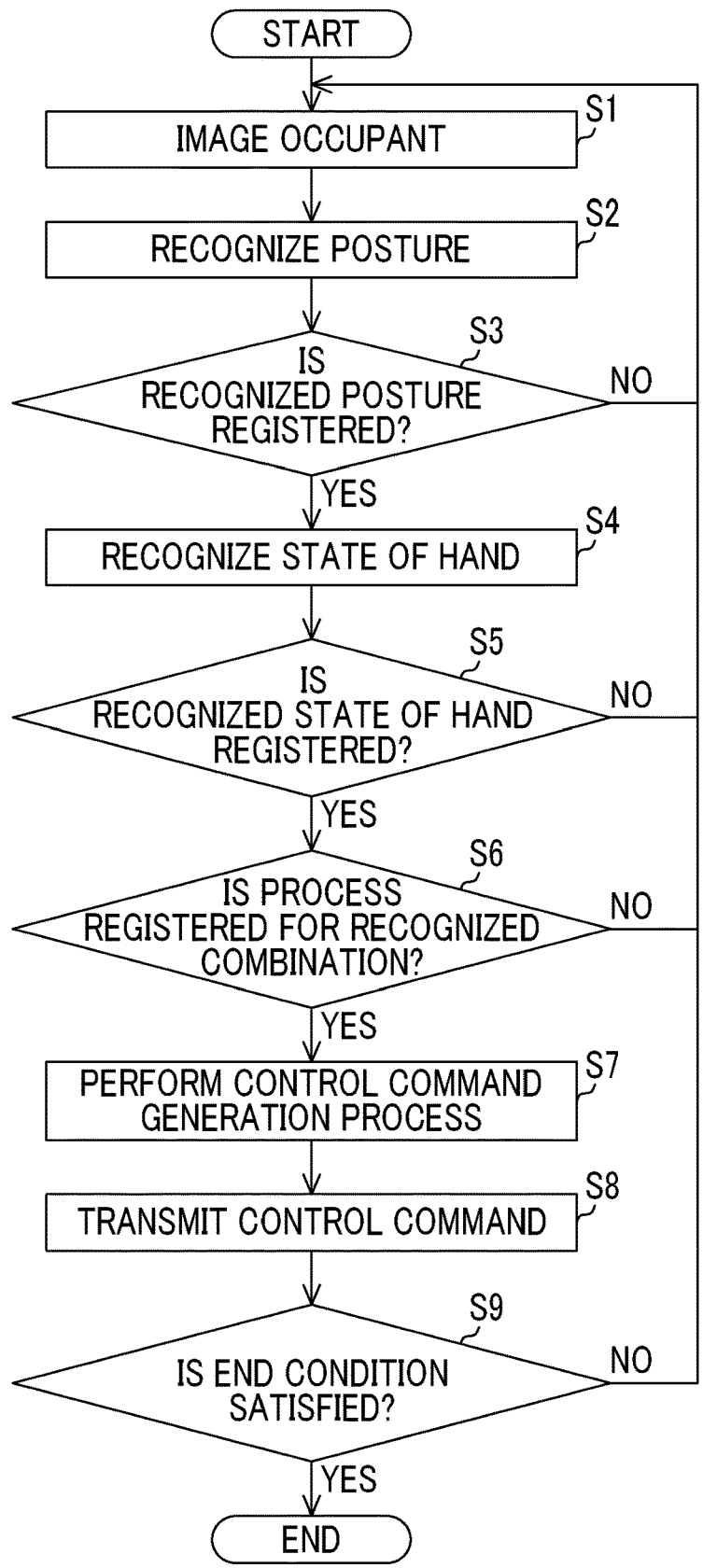
FIG. 2 is a flowchart illustrating a control process that is executed by the device control apparatus according to the first embodiment.
Figure 3:
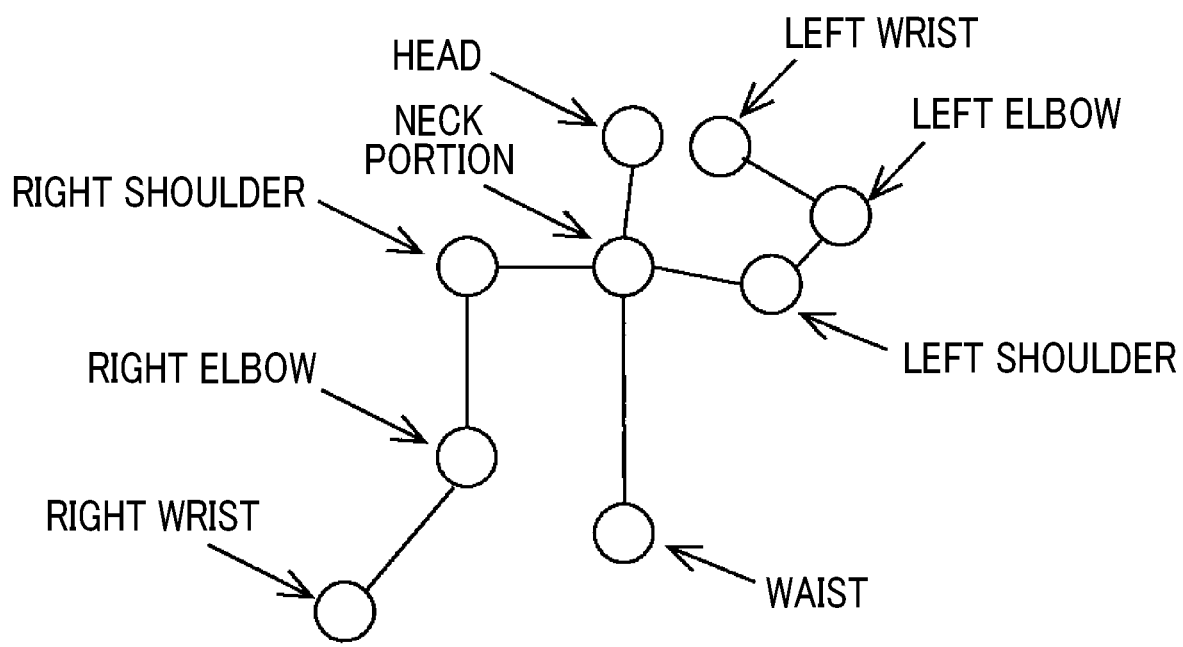
FIG. 3 is a diagram illustrating an example of a method of detecting a posture of an occupant.

FIG. 2 is a flowchart illustrating a control process that is executed by the device control apparatus according to the first embodiment, FIG. 3 is a view illustrating an example of a method of detecting a posture of an occupant, and FIG. 4 is a diagram illustrating an example of the discrimination processing table to which the device control apparatus according to the first embodiment refers. The process illustrated in FIG. 2 is a process that is started when the vehicle is started up and repeatedly executed at predetermined intervals until an engine is stopped or power is turned off (until an end condition is satisfied).

Step S1: The imaging unit 10 captures an image of the occupant. The image captured by the imaging unit 10 is an image in a range including an upper body and hands of the occupant seated on a seat. Further, in the following description, the imaging unit 10 is provided near the roof on the front side of the vehicle, and images the occupant from an upper front. Thereafter, the process proceeds to step S2.

Step S2: The first recognition unit 11 detects the posture of the occupant from the image captured by the imaging unit 10. As described above, the posture of the occupant can be represented by a combination of position information of joints of the occupant calculated based on skeletal recognition. For example, the first recognition unit 11 can represent the posture of the occupant by acquiring three-dimensional coordinates of each of a head, a neck, a waist, a right shoulder, a right elbow, a right wrist, a left shoulder, a left elbow, and a left wrist of the occupant through the skeletal recognition and generating a skeleton coordinate sequence that is a combination of three-dimensional coordinates, as illustrated in FIG. 3. Thereafter, the process proceeds to step S3.

Step S3: The discrimination processing unit 13 determines whether the posture of the occupant recognized by the first recognition unit 11 is registered in the discrimination processing table. As illustrated in FIG. 4, the discrimination processing table defines information indicating the posture of the occupant, information indicating the state of the hand of the occupant, and the vehicle-mounted device 20 to be controlled and the operation to be executed in association with each other. In the example of the discrimination processing table of FIG. 4, the skeleton coordinate sequence is defined as the information indicating the posture of the occupant. The skeleton coordinate sequence is obtained by arranging the three-dimensional coordinates of respective parts illustrated in FIG. 3 in a certain order, and represents a skeleton pattern. The discrimination processing unit 13 sequentially compares the skeleton coordinate sequence of the occupant generated by the first recognition unit 11 with the respective skeleton coordinate sequences registered in the discrimination processing table, and determines whether the skeleton coordinate sequence generated by the first recognition unit 11 is registered based on a degree of matching of both the skeleton coordinate sequences. The discrimination processing unit 13 can tolerate a certain degree of deviation between the skeleton coordinate sequence generated by the first recognition unit 11 and the skeleton coordinate sequence registered in the discrimination processing table, and can determine that the skeleton coordinate sequence generated by the first recognition unit 11 is registered in the discrimination processing table when a distance difference between the coordinates of both the skeleton coordinate sequences is smaller than a predetermined threshold value even when the coordinates do not completely match. When a result of the determination in step S3 is YES, the process proceeds to step S4 and, otherwise, the process proceeds to step S1.

The occupant is seated inside the vehicle, and a posture that can be taken by the occupant is limited to a posture that can be taken by an upper body. It is desirable for the postures of the occupant to be registered in the discrimination processing table to be postures easy to take during a driving manipulation, which are postures easy to distinguish from each other among postures that can be taken by the upper body. It is more desirable for the posture of the occupant to be registered in the discrimination processing table to be a posture different from the posture that can be taken by the occupant during a driving manipulation. For example, it is difficult for the occupant to take a posture for greatly tilting or twisting the upper body inside the vehicle during a driving manipulation. Therefore, it is desirable for the posture of the occupant registered in the discrimination processing table to be a plurality of postures in which positions of an elbow and a wrist joints have been changed with respect to joint positions of a head portion or a shoulder. Specifically, it is easy to detect a posture in which the wrist is disposed in any one of the right side, the left side, or the front side of the head portion, a posture in which the wrist or the elbow is disposed on the upper side or the lower side of the shoulder, or the like.

Step S4: The second recognition unit 12 detects the state of the hand of the occupant from the image captured by the imaging unit 10. As described above, the state of the hand of the occupant can be represented by a shape of the hand or the shape of the hand and a direction of the hand. For example, the second recognition unit 12 can recognize a shape and hand direction of the hand of the occupant using image recognition based on deep learning. Thereafter, the process proceeds to step S5.

Step S5: The discrimination processing unit 13 determines whether the state of the hand recognized by the second recognition unit 12 is registered in the discrimination processing table. As illustrated in FIG. 4, in the discrimination processing table, the shape of the hand or a combination of the shape of the hand and the direction of the hand (a fingertip) is defined as the state of the hand. In the example of the discrimination processing table illustrated in FIG. 4, a shape of rock (a shape in which all fingers are folded for holding), a shape of a paper (a shape in which all the fingers are unfolded), a shape of a V sign, and a shape of an erected index finger are defined as shapes of the hand, and a fingertip direction of the index finger is combined with the shape of the hand with the erected index finger. Although the direction of the hand (the fingertip) is defined solely for the shape of the hand with the erected index finger in the example of FIG. 4, the direction of the hand (the fingertip) may be defined for other shapes of the hand. Further, the direction of the hand is not limited to the direction of the fingertip and may be defined by a direction of a palm or a back of the hand. Note that the direction of the hand (the fingertip) is not indispensable and the state of the hand may be defined by solely the shape of the hand. The discrimination processing unit 13 determines the presence or absence of registration according to whether a combination of the shape of the hand and the direction of the hand (a fingertip direction) recognized by the second recognition unit 12 matches the state of the hand registered in the discrimination processing table. When a result of the determination in step S5 is YES, the process proceeds to step S6 and, otherwise, the process proceeds to step S1.

Step S6: The discrimination processing unit 13 performs a control process on the combination of the posture of the occupant recognized by the first recognition unit 11 and the state of the hand of the occupant recognized by the second recognition unit 12, that is, determines whether the vehicle-mounted device 20 to be controlled and the operation to be executed are registered in the discrimination information table. For example, in the example of FIG. 4, when the posture of the occupant is recognized as {(x2, y2, z2), . . . }, the shape of the hand is recognized as an "index finger", and the fingertip direction is recognized as "right (when viewed from the imaging unit)", a "passenger seat window" is registered as the vehicle-mounted device 20 to be controlled in the discrimination processing table, and "voice recognition activation" is registered as "operation" in the discrimination processing table, for the combination of the recognized posture and the recognized state of the hand. In this case, the discrimination processing unit 13 determines YES in step S6. When a result of the determination in step S6 is YES, the process proceeds to step S7 and otherwise, the process proceeds to step S1.

An operation of directly controlling the vehicle-mounted device 20 to be controlled and an operation of controlling the vehicle-mounted device 20 to be controlled via a device separate from the vehicle-mounted device 20 to be controlled can be registered in a discrimination processing table. In the example of FIG. 4, an operation of turning an air conditioner on or off or an operation of setting a wiper to a service mode corresponds to the operation of directly controlling the vehicle-mounted device 20 to be controlled. Further, in the example of FIG. 4, the operation of activating the voice recognition process in order to control the window of the passenger seat or a slide roof corresponds to the operation of controlling the vehicle-mounted device 20 to be controlled via the separate device.

Step S7: The controller 14 performs a control command generation process based on a discrimination result of the discrimination processing unit 13. The controller 14 generates a control command for instructing the registered operation for the vehicle-mounted device 20 to be controlled registered for the combination of the recognized posture of the occupant and the recognized state of the hand. For example, in the example of FIG. 4, when the posture of the occupant is recognized as {(x2, y2, z2), . . . }, the shape of the hand is recognized as an "index finger", and the fingertip direction is recognized as "right (when viewed from the imaging unit)", a control command for starting the voice recognition process is generated in order to manipulate the window of the passenger seat. This control command is a command equivalent to a command issued when a voice recognition button provided in the steering wheel or the like is pressed in order to start the voice recognition process. Further, in a voice recognition process for manipulating the window of the passenger seat, an utterance such as "open the window" or "close the window", which is an instruction for opening or closing the window of the passenger seat, is recognized.

The voice recognition process may be performed by a voice recognition unit of the vehicle-mounted device 20 to be controlled when the vehicle-mounted device 20 includes the voice recognition unit, may be performed by a voice recognition unit (not illustrated) provided in the device control apparatus 1, or may be performed by a voice recognition device connected to the device control apparatus 1 via a communication network or a signal line.

In addition, in step S7, the controller 14 can further generate an auxiliary command to instruct an operation to be executed when a predetermined condition is satisfied. As described above, the auxiliary command is a command that is issued after the operation instructed by the control command is started, and intended to instruct the auxiliary operation to the vehicle-mounted device 20 to be controlled. Whether the auxiliary command is generated and content of the auxiliary command to be generated may be registered in the discrimination processing table for each combination of the posture and the state of the hand, or may be determined for each combination of the vehicle-mounted device 20 to be controlled and an operation. For example, when the controller 14 has generated a control command to operate voice recognition in order to manipulate a window of a passenger seat in step S7, the controller 14 can generate an auxiliary command for stopping a window opening operation or a window closing operation, or an auxiliary command for interrupting a voice recognition process for receiving an instruction to manipulate the window of the passenger seat. As a condition to be satisfied for issuance of these auxiliary commands, for example, pressing of any button provided inside the vehicle, or changing of the posture recognized in step S2 or the hand state recognized in step S5 can be set.

After the controller 14 generates the control command and the auxiliary command as needed, the process proceeds to step S8.

Step S8: The controller 14 issues the control command generated in step S7. When the controller 14 controls the vehicle-mounted device 20 to be controlled via a separate device such as a voice recognition device, the separate device may transmit the control command to the vehicle-mounted device 20 to be controlled or the controller 14 may transmit the control command to the vehicle-mounted device 20 based on processing results of the separate device. Thereafter, the process proceeds to step S9.

Step S9: The controller 14 determines whether a process end condition such as stop of an engine of the vehicle or off of power is satisfied. When a result of the determination in step S9 is YES, the process ends and otherwise the process proceeds to step S1.

Effects or the Like

In a configuration in which the vehicle-mounted device to be controlled and the operation to be executed are specified based on solely the shape of the hand or the motion (gesture) of the hand, since there is a change in position of the hand due to vibration during traveling or a motion of the hand for a driving manipulation, it is difficult to always accurately recognize the shape or motion of the hand. Therefore, the vehicle-mounted device is likely to be unable to be controlled as intended by the occupant, or an unexpected operation of the vehicle-mounted device due to accidental match between a shape or motion of the hand of the occupant and a registered shape or motion is likely to be performed. It is conceivable that a shape or motion (gesture) of the hand easy to recognize is a detection target. However, in this case, since the number of functions that can be assigned to the shape or motion of the hand decreases, manipulations that can be instructed by the shape or motion of the hand are limited.

On the other hand, the device control apparatus 1 according to the embodiment specifies the vehicle-mounted device 20 to be controlled and the operation to be executed, based on the combination of the posture and the state of the hand detected from the captured image of the occupant. Since the posture of the occupant is distinguished by a relative arrangement of the respective joints, a difference between the positions of the respective joints for each posture is clearer than a shape or motion of the hand, and the posture is easier to discriminate than the shape or the motion of the hand. In a device that receives a manipulation instruction of the vehicle-mounted device 20 from the occupant based on the captured image of the occupant, it is possible to improve discrimination accuracy of the manipulation instruction by incorporating the posture of the occupant in the manipulation instruction, as in the embodiment. Further, as in the embodiment, when the vehicle-mounted device 20 that is a manipulation target and the operation to be executed are assigned to the combination of the posture of the occupant and the state of the hand, it is possible to increase the number of assignable functions as compared with a case in which the vehicle-mounted device 20 that is a manipulation target and the operation to be executed are assigned to solely the posture of the occupant or solely the state of the hand. In consideration of the motion of the hand due to vibration or a driving manipulation during traveling of the vehicle, it is desirable for the state of the hand, which is a detection target, to be easy to recognize. In this case, although types of states of the hand, which are detection targets, are limited, it is possible to increase the number of assignable functions while adopting a shape of a hand with high recognition accuracy, by combining postures of the occupant, as in the embodiment.

Modification Example of First Embodiment

FIG. 5 is a diagram illustrating an example of a discrimination processing table to which a device control apparatus according to a modification example of the first embodiment refers.

A basic configuration of the device control apparatus according to the modification example is the same as that of the device control apparatus 1 according to the first embodiment, but both are different from each other in content of the discrimination processing table to which the discrimination processing unit refers, and the process that the discrimination processing unit performs in order to specify the vehicle-mounted device to be controlled and the operation to be executed. Hereinafter, differences between the modification example and the first embodiment will be mainly described with reference to FIGS. 1, 5, and 6 together.

As illustrated in FIG. 5, in the discrimination processing table according to the modification example, a maintenance time of the posture of the occupant and the state of the hand is further associated with each combination of the information indicating the posture of the occupant and the information indicating the hand state. The maintenance time is a threshold value that is used to discriminate whether the posture of the occupant and the state of the hand associated with the maintenance time are intentional or accidental. When the posture of the occupant and the state of the hand continue for the defined maintenance time or more, an intentional manipulation instruction can be regarded as having been performed by the occupant.

FIG. 6 is a flowchart illustrating a control process that is executed by the device control apparatus according to the modification example of the first embodiment. The flowchart illustrated in FIG. 6 is obtained by inserting step S20 between step S6 and step S7 of the flowchart illustrated in FIG. 2.

Step S20: When the discrimination processing unit 13 has determined that the vehicle-mounted device 20 to be controlled and the operation to be executed are registered for the combination of the posture of the occupant recognized by the first recognition unit 11 and the state of the hand of the occupant recognized by the second recognition unit 12 (YES in step S6), the discrimination processing unit 13 acquires the maintenance time associated with the combination of the recognized posture of the occupant and the recognized state of the hand by referring to the discrimination processing table illustrated in FIG. 5. The discrimination processing unit 13 starts a timer to measure the continuance time of the recognized posture of the occupant and the recognized state of the hand, and determines whether the posture of the occupant and the state of the hand continue for the maintenance time acquired from the discrimination processing table, or more. When a result of the determination in step S20 is YES, the process proceeds to step S7, and otherwise, the process proceeds to step S1.

For example, when the first recognition unit 11 recognizes that the posture of the occupant is {(x3, y3, z3, . . . )} and the second recognition unit 12 recognizes that the hand shape is a "V sign", an "air conditioner" is registered as the vehicle-mounted device to be controlled, "ON" is registered as the operation to be executed, and "1000 milliseconds" is registered as the maintenance time for the combination of the recognized posture and the state of the hand in the example of the discrimination processing table illustrated in FIG. 5. The discrimination processing unit measures the continuance time from the recognition of the posture of the occupant {(x3, y3, z3), . . . } and the hand shape "V sign" with a timer. When the recognized posture and the recognized hand state continue for 1000 milliseconds or more, the discrimination processing unit generates and transmits a control command for turning on the air conditioner, and the above-described auxiliary command, if needed. On the other hand, when at least one of the posture {(x3, y3, z3), . . . } and the hand shape "V-sign" of the occupant is not recognized before 1000 milliseconds that is the maintenance time elapses, a process of recognizing the posture of the occupant and the state of the hand is continued without generation of the control command.

In the device control apparatus according to the modification example, the discrimination processing unit 13 can discriminate whether the combination of the recognized posture of the occupant and the recognized state of the hand is intentionally performed or accidentally generated, by determining the combination of the posture of the occupant and the state of the hand has continued for the maintenance time or more. Therefore, with the device control apparatus according to the modification example, it is possible to further improve discrimination accuracy of a manipulation request of the vehicle-mounted device 20 intentionally performed by the occupant.

During a driving manipulation, for example, a shape of the hand similar to a shape of "rock" may be created by grasping a shift lever or a steering wheel or a shape of the hand similar to a shape of "paper" may be created by pressing a horn button. In the first embodiment, since the manipulation instruction is determined by combining not only the shape of the hand but also the posture of the occupant, determination accuracy is higher than in a case in which the manipulation instruction is determined by using solely the shape of the hand. However, when a shape of the hand with a high frequency of occurrence such as the shape of the rock or the shape of paper is used for a manipulation instruction, there is a possibility of an erroneous discrimination being accidentally made depending on the posture of the occupant. In the device control apparatus according to the modification example, it is possible to reduce a possibility of the erroneous discrimination being accidentally made even when the shape of the hand easy to generate due to a driving manipulation or the like is used for the discrimination of the manipulation instruction.

In the modification example, the number of recognitions of the posture and the state of the hand not continued for the maintenance time or more may be recorded for each combination of the posture of the occupant and the state of the hand registered in the discrimination processing table, and the combination of the posture and the state of the hand of which the recorded number is greater than a predetermined threshold value may be invalidated or the maintenance time of the combination of the posture and the state of the hand of which the recorded number is greater than the predetermined threshold value may be further increased. When a frequency at which the combination of the posture of the occupant and the state of the hand does not continue for the maintenance time or more is high, it is conceivable that it is easy for an instruction of the combination to accidentally occur or it is easy for the occupant to select the instruction of the combination by mistake. Therefore, by deleting the combination having the frequency at which the combination of the posture and the state of the hand does not continue for the maintenance time or more is high or changing the maintenance time thereof, it is possible to prevent such a combination from being accidentally selected. When the combination of the posture and the state of the hand registered in the discrimination processing table is invalidated or the maintenance time associated with the combination is updated, a notification may be sent to the user by a display unit or the like in the vehicle.

In the examples of FIGS. 4 and 5, the position of each of the joints constituting the skeleton coordinate sequence may be represented by a range of coordinates instead of a specific coordinate. Further, the coordinates of each joint may be represented by relative coordinates with reference to a predetermined reference point or may be represented by coordinate values of a coordinate system fixed to an imaging range of the camera in advance.

Second Embodiment

FIG. 7 is a functional block diagram of a device control apparatus according to a second embodiment.

A device control apparatus 2 according to the embodiment includes a discrimination processing unit 15 in place of the discrimination processing unit 13 of the device control apparatus 1 according to the first embodiment, and further includes a vehicle state estimation unit 16. Hereinafter, differences between the embodiment and the first embodiment will be mainly described.

The vehicle state estimation unit 16 acquires various vehicle signals regarding an operation of the vehicle from other control devices or sensors connected via a communication network or a signal line, and estimates a state of the vehicle based on the acquired vehicle signals. Examples of the vehicle signals acquired by the vehicle state estimation unit 16 may include signals indicating a vehicle speed, an accelerator pedal manipulation amount, a brake pedal manipulation amount, a shift range, an opened and closed state of each door, a lock state of each door, and the like, and are not limited thereto. Examples of the state of the vehicle that is estimated by the vehicle state estimation unit 16 may include traveling, stopping, parking, and getting on or off, and are not limited thereto. The vehicle state estimation unit 16 outputs the estimated state of the vehicle to the discrimination processing unit 15.

When the discrimination processing unit 15 has specified the vehicle-mounted device 20 to be controlled and the operation to be executed, based on the posture of the occupant recognized by the first recognition unit 11 and the state of the hand of the occupant recognized by the second recognition unit 12, the discrimination processing unit 15 determines whether the specified operation is executable based on the state of the vehicle estimated by the vehicle state estimation unit 16. For example, information in which the vehicle-mounted device 20 to be controlled and the operation to be executed are associated with the state of the vehicle in which execution of the operation is permitted (or prohibited) is prepared in advance, and the discrimination processing unit 15 can determine whether the specified vehicle-mounted device 20 to be controlled and the specified operation to be executed are permitted by referring to this information. The state of the vehicle in which the operation is permitted (or prohibited) may be defined in the discrimination processing table (FIGS. 4 and 5) or may be defined as information separate from the discrimination processing table. A method for specifying the vehicle-mounted device 20 to be controlled and the operation to be executed, which is performed by the discrimination processing unit 15, is the same as in the first embodiment.

When the discrimination processing unit 15 determines that execution of the operation specified based on the posture of the occupant and the state of the hand is possible, the controller 14 generates and issues a control command for instructing the specified operation.

FIG. 8 is a flowchart illustrating a control process that is executed by the device control apparatus according to the second embodiment. In the flowchart illustrated in FIG. 8, steps S25 and S26 are inserted between step S6 and step S7 of the flowchart illustrated in FIG. 2.

Step S25: When the discrimination processing unit 15 determines that the vehicle-mounted device 20 to be controlled and the operation to be executed are registered for the combination of the posture of the occupant recognized by the first recognition unit 11 and the state of the hand of the occupant recognized by the second recognition unit 12 (YES in step S6), the vehicle state estimation unit 16 estimates the state of the vehicle based on the vehicle signal. The vehicle state estimation unit can estimate the state of the vehicle such as traveling, stopping, parking, and getting on or off based on one or a combination of two or more a vehicle speed, an accelerator pedal manipulation amount, a brake pedal manipulation amount, a shift range, an opened and closed state of each door, a lock state of each door, and the like.

Step S26: The discrimination processing unit 15 determines whether the operation specified in step S6 is permitted based on the state of the vehicle estimated by the vehicle state estimation unit 16. As described above, the discrimination processing unit 15 can determine whether the execution of the specified operation is permitted, by referring to the information in which the vehicle-mounted device 20 to be controlled and the operation to be executed are associated with the state of the vehicle in which the execution of the operation is permitted (or prohibited). When a result of the determination in step S26 is YES, the process proceeds to step S7 and otherwise, the process proceeds to step S1.

In the device control apparatus 2 according to the embodiment, it is possible to permit or restrict the vehicle-mounted device 20 to be controlled and the operation to be executed, which have been specified based on the posture of the occupant and the state of the hand, according to the state of the vehicle. Therefore, for example, it is possible to prohibit a manipulation of a car navigation system or a manipulation for opening the window during traveling of the vehicle, to suppress accidental execution of an operation assigned to a posture or a hand state easy to occur due to a driving manipulation during traveling of the vehicle, or to suppress the lowering of the load, and to suppress accidental execution of an operation assigned to a posture or a state of the hand easy to occur due to getting-on and -off of an occupant at the time of stopping of the vehicle. In the device control according to the embodiment, it is possible to finely control the manipulation of the vehicle-mounted device 20 based on the posture of the occupant and the state of the hand according to the state of the vehicle. Further, since the posture of the occupant and the state of the hand easy to occur in a specific state of the vehicle are invalidated solely in the specific state of the vehicle, and can be used for a manipulation of the vehicle-mounted device 20 in other states of vehicle, it is possible to increase the number of combinations of the posture of the occupant and the state of the hand to which a function can be assigned.

Although the example in which the decision is made whether the vehicle-mounted device 20 to be controlled and the operation to be executed, which have been specified based on the posture of the occupant and the state of the hand, are permitted according to the state of the vehicle has been described in the embodiment, a discrimination processing table may be prepared for each state of the vehicle, and the vehicle-mounted device 20 to be controlled and the operation to be executed, which are specified based on the posture of the occupant and the state of the hand, may be differentiated according to the state of the vehicle. Further, solely the operation that is specified based on the posture of the occupant and the state of the hand may be differentiated according to the state of the vehicle. By doing so, for example, even when postures and the states of the hand when the occupant instructs the manipulation of the vehicle-mounted device 20 are the same, for example, it is possible to change the vehicle-mounted device that is a manipulation target or content of a manipulation to be instructed during stopping and traveling of the vehicle, and to further finely control the manipulation of the vehicle-mounted device 20 based on the posture of the occupant and the state of the hand according to the state of the vehicle.

Further, the decision of the vehicle-mounted device 20 to be controlled and the operation to be executed based on the state of the vehicle described in the embodiment is also applicable to the modification example of the first embodiment. Specifically, steps S25 and S26 in FIG. 8 are inserted between step S20 and step S7 in FIG. 6, and when the combination of the recognized posture and the recognized state of the hand continues for the maintenance time or more (step YES at S20), the discrimination processing unit 15 determines whether to perform the vehicle-mounted device 20 to be controlled and the operation to be executed, which have been specified by the combination of the recognized posture and the recognized state of the hand based on the vehicle state acquired by the vehicle state estimation unit 16. When the discrimination processing unit 15 determines the operation is permitted (YES in step S26), the controller 14 may generate and issue a control command (step S7). According to this control, it is possible to further improve discrimination accuracy of a manipulation request of the vehicle-mounted device 20 intentionally performed by the occupant while further finely controlling the manipulation of the vehicle-mounted device 20 based on the posture of the occupant and the state of the hand according to the state of the vehicle.

Third Embodiment

Figure 9:
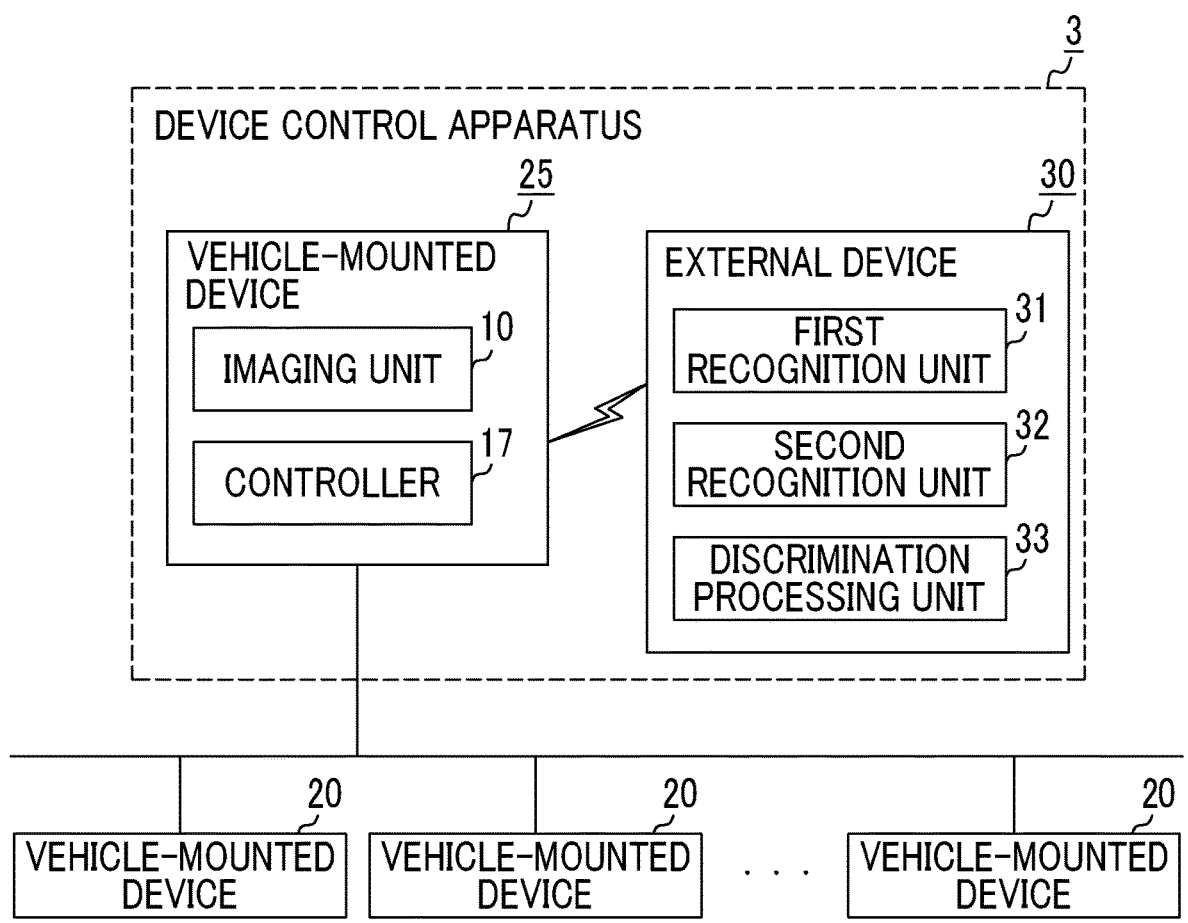
FIG. 9 is a functional block diagram of a device control apparatus according to a third embodiment.

FIG. 9 is a functional block diagram of a device control apparatus according to a third embodiment.

A device control apparatus 3 according to the embodiment includes a vehicle-mounted apparatus 25 including an imaging unit 10 and a controller 17, and an external device 30 including a first recognition unit 31, a second recognition unit 32, and a discrimination processing unit 33. The external device 30 is, for example, a server capable of communicating with the vehicle-mounted apparatus 25 through wireless communication, or a smartphone capable of communicating with the vehicle-mounted apparatus 25 through wired communication or wireless communication. When the external device 30 is the smartphone, the external device 30 can be connected to the vehicle-mounted apparatus by a USB, a LAN, Bluetooth (registered trademark), or the like, but a connection scheme is not limited thereto.

The imaging unit 10, the first recognition unit 31, the second recognition unit 32, the discrimination processing unit 33, and the controller 17 are the same as the imaging unit 10, the first recognition unit 11, the second recognition unit 12, the discrimination processing unit 13, and the controller 14 described in the first embodiment or the modification example of the first embodiment, respectively. However, in the embodiment, since the first recognition unit 31, the second recognition unit 32, and the discrimination processing unit 33 are in the external device 30 separate from the vehicle-mounted apparatus 25, an image of an occupant captured by the imaging unit 10 is transmitted to the first recognition unit 31 and the second recognition unit 32 through wired communication or wireless communication. Similarly, determination results of the discrimination processing unit 33 (the vehicle-mounted device 20 to be controlled and the operation to be executed corresponding to recognition results of the posture of the occupant and the state of the hand, and the recognized posture of the occupant and the recognized state of the hand have continued for the maintenance time or more) are transmitted to the controller 17 through wired communication or wireless communication.

In the embodiment, since the discrimination processing unit 33 is provided in the external device 30, the discrimination processing table to which the discrimination processing unit 33 refers is also stored in a storage device of the external device 30. When the discrimination processing table is stored in a device external to the vehicle, it is possible to customize the vehicle-mounted device 20 and a manipulation thereof that can be instructed by a combination of the posture and the state of the hand, according to preference, by the user changing content of the discrimination processing table using a smartphone, a web application, or the like.

Further, although the configuration in which the image of the occupant is captured using the imaging unit 10 of the vehicle-mounted apparatus 25 has been adopted in the third embodiment, a camera of the external device 30 may be used as the imaging unit 10 when the external device 30 is a smartphone or a tablet including the camera.

Further, the configurations of the vehicle-mounted apparatus 25 and the imaging unit 10 of the embodiment may be applied to the second embodiment described above. In this case, the vehicle state estimation unit 16 illustrated in FIG. 7 may be provided in the vehicle-mounted apparatus 25, and the state of the vehicle estimated by the vehicle state estimation unit 16 may be transmitted to the discrimination processing unit 33 through wired communication or wireless communication. Alternatively, when the external device 30 is the smartphone or the tablet, the vehicle state estimation unit 16 illustrated in FIG. 7 may be provided in the external device 30. When the vehicle state estimation unit 16 is provided in the external device 30, the state of the vehicle may be determined using an acceleration sensor, a GPS, or the like included in the external device 30.

Other Modification Examples

In the device control apparatus, not only an occupant at a driver's seat but also an occupant at a passenger seat or rear seats may be a detection target of a manipulation instruction. In this case, it is possible to prepare the discrimination processing table for each seating position of the occupant and to change the vehicle-mounted device 20 that can be manipulated or a possible manipulation for each seating position of the occupant.

Further, in the device control apparatus, the degree of matching between the recognized posture and the discrimination processing table is determined, the degree of matching between the recognized state of the hand and the data of the discrimination processing table is determined, and then, the vehicle-mounted device to be controlled and the operation to be executed, which are associated with the combination of the recognized posture and the recognized state of the hand, are specified, but a specifying method is not limited thereto. For example, data matching the recognized posture may be extracted from the discrimination processing table, and a degree of matching between the recognized state of the hand and the extracted data may be determined, such that the vehicle-mounted device to be controlled and the operation to be executed are specified. Alternatively, the vehicle-mounted device to be controlled and the operation to be executed may be specified by determining the degree of matching between the recognized posture and the recognized state of the hand, and the data of the discrimination processing table.

Further, in the device control apparatus, the discrimination processing table may be registered for each user, and switching between the discrimination processing tables may be performed according to the users at the time of getting on the vehicle. For example, identification information (code, biometric information, or the like) for specifying a user may be associated with the discrimination information table at the time of registration of the discrimination processing tables, and the identification information of the user may be input and the discrimination processing table associated with the input identification information may be acquired at the time of getting on the vehicle. Further, a fingerprint or an image of a face can be used as the identification information of the user. When the image of the face is used as the identification information of the user, the user can be identified by the imaging unit imaging the face of the user at the time of getting on the vehicle. Further, in the third embodiment, when a smartphone or a tablet including a camera is used as the external device, the user may be identified using a fingerprint or face recognition function of the external device when the user gets on the vehicle.

Further, in the device control apparatus, the discrimination processing table may be stored in a storage device mounted in the vehicle or may be stored in a storage device of the external device (a server, a smartphone, a tablet, or the like) of the vehicle. Further, the discrimination processing table may be acquired from the external device and stored in the storage device mounted in the vehicle at the time of getting on the vehicle or at the time of the start-up of the vehicle.

Further, although an example in which the recognition result of the posture of the occupant is output as the skeleton coordinate sequence has been described in the above-described device control apparatus, the recognition result may be an abstract output based on machine learning instead of the coordinate sequence. For example, an abstract concept such as rear seat look-back, search of an object on the passenger seat, or a seat belt mounting posture may be learned using a large number of images, and the posture of the occupant may be output as the abstracted concept based on a captured image of the occupant.

Further, in the device control apparatus, a motion (a gesture) of the hand such as waving the hand right and left, raising and lowering the hand, or folding and unfolding a finger may be recognized as the state of the hand. In this case, it is desirable for the motion of the hand, which is a recognition target, to be as simple as possible in consideration of a possibility of a motion of the hand being not accurately recognized due to vibration or a driving manipulation during traveling of the vehicle.

The present disclosure can be used as a device control apparatus for controlling vehicle-mounted devices.

What is claimed is:

1. A device control apparatus for controlling a device mounted in a vehicle, the device control apparatus comprising:
    a camera configured to capture an image of an occupant in the vehicle; and
    at least one processor programed to
        recognize a posture of the occupant based on the image captured by the camera;
        recognize a shape of a hand of the occupant based on the image captured by the camera;
        specify a device to be controlled and an operation to be executed based on a combination of the recognized posture of the occupant and the recognized shape of the hand; and
        issue a control command corresponding to the specified device to be controlled and the specified operation to be executed.

2. The device control apparatus according to claim 1, wherein the at least one processor is configured to specify the device to be controlled and the operation to be executed, by referring to discrimination processing information in which information indicating the posture of the occupant, information indicating the shape of the hand, information indicating the device, and information indicating the operation are associated in advance.

3. The device control apparatus according to claim 2, wherein:
    in the discrimination processing information, a skeleton pattern represented by a skeleton coordinate sequence is defined as the information indicating the posture of the occupant, and the shape of the hand is defined as the information indicating the shape of the hand;
    the at least one processor is configured to recognize a skeleton coordinate sequence of the occupant from the image captured by the camera; and
    the at least one processor is configured to specify the device and the operation associated with the recognized posture of the occupant and the recognized shape of the hand as the device to be controlled and the operation to be executed, based on a degree of matching between (i) the recognized skeleton coordinate sequence of the occupant and the discrimination processing information and (ii) the recognized shape of the hand and the discrimination processing information.

4. The device control apparatus according to claim 2, wherein:
    in the discrimination processing information, a maintenance time of the posture of the occupant and the shape of the hand is further defined in association with each combination of the information indicating the posture of the occupant and the information indicating the shape of the hand;
    the at least one processor is configured to also determine whether the recognized posture of the occupant and the recognized shape of the hand have continued for the maintenance time defined in the discrimination processing information or more, when the at least one processor specifies the device to be controlled and the operation to be executed based on a degree of matching between (i) the recognized posture and the discrimination processing information and (ii) the recognized shape of the hand and the discrimination processing information; and
    the at least one processor is configured to issue the control command in response to specifying the device to be controlled and the operation to be executed, and determining that the recognized posture of the occupant and the recognized shape of the hand have continued for the maintenance time defined in the discrimination processing information, or more.

5. The device control apparatus according to claim 1, wherein the at least one processor is further programed to estimate a state of the vehicle, and
    the at least one processor is configured to decide whether to permit the specified operation based on the state of the vehicle estimated by the vehicle state estimation unit; and
    the at least one processor is configured to issue the control command in response to specifying the device to be controlled and the operation to be executed and deciding that the specified operation is permitted.

6. The device control apparatus according to claim 1, wherein the at least one processor is configured to issue an auxiliary command for interrupting or changing an operation instructed by the control command in response to a predetermined condition being satisfied after the control command has been issued.

* * * * *